(12) United States Patent
Gu et al.

(10) Patent No.: US 11,221,514 B2
(45) Date of Patent: Jan. 11, 2022

(54) LIQUID CRYSTAL DISPLAY, DISPLAY METHOD AND TERMINAL

(71) Applicant: BEIJING XIAOMI MOBILE SOFTWARE CO., LTD., Beijing (CN)

(72) Inventors: Jianglin Gu, Beijing (CN); Chiafu Yen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/587,011

(22) Filed: Sep. 29, 2019

(65) Prior Publication Data
US 2020/0249526 A1    Aug. 6, 2020

(30) Foreign Application Priority Data
Jan. 31, 2019    (CN) .......................... 201910100703.4

(51) Int. Cl.
*G02F 1/13357* (2006.01)
*G02F 1/1335* (2006.01)

(52) U.S. Cl.
CPC .. *G02F 1/133603* (2013.01); *G02F 1/133526* (2013.01)

(58) Field of Classification Search
None
See application file for complete search history.

(56) References Cited

U.S. PATENT DOCUMENTS

2013/0015482 A1*  1/2013  Su ........................... H01L 33/58
                                                        257/98
2016/0161664 A1*  6/2016  Ishida ...................... G02B 6/00
                                                        359/230

FOREIGN PATENT DOCUMENTS

| CN | 107784989 A | 3/2018 |
|---|---|---|
| CN | 108469704 A | 8/2018 |
| CN | 108810199 A | 11/2018 |

OTHER PUBLICATIONS

Extended European Search Report dated Feb. 20, 2020 in EP19206279.2.

* cited by examiner

*Primary Examiner* — Edward J Glick
*Assistant Examiner* — David Y Chung
(74) *Attorney, Agent, or Firm* — Syncoda LLC; Feng Ma (57) ABSTRACT

A liquid crystal display includes a backlight layer, a colorless region, and a backlight layer. The backlight layer is configured to have a first light-transmission hole. The colorless region is provided between a liquid crystal layer and an outer polarizing layer, and corresponds to the first light-transmission hole. The backlight is disposed at the first light-transmission hole and its light is projected on liquid crystal display and corresponds to the colorless region.

17 Claims, 8 Drawing Sheets

LIQUID CRYSTAL DISPLAY, DISPLAY METHOD AND TERMINAL

CROSS-REFERENCE TO RELATED APPLICATIONS

The present application claims priority to Chinese Patent Application No. 201910100703.4 filed on Jan. 31, 2019, the disclosure of which is hereby incorporated by reference in its entirety.

BACKGROUND

In recent years, full screen has become a new trend in the development of smart phones. Full-screen smart phones have a larger percentage of effective screen areas and are more aesthetically pleasing to users. In order to ensure normal use of components such as the front camera of the smart phones, Some smart phones are arranged to have holes or notches in the display panel, or provide a pop up component.

SUMMARY

The present disclosure relates generally to terminal technologies, and more specifically to a liquid crystal display, a display method and a terminal.

Various embodiments of the present disclosure provide a liquid crystal display, a display method and a terminal.

According to a first aspect, an embodiment of the present disclosure provides a liquid crystal display (LCD), including:

a liquid crystal layer, including a first region and a second region;

a backlight layer disposed under the liquid crystal layer and formed with a first light-transmission hole, the first light-transmission hole being disposed under the second region; and a backlight disposed at the first light-transmission hole, wherein light of the backlight is projected on the second region through the first light-transmission hole.

According to a second aspect, an embodiment of the present disclosure provides a display method applied to the liquid crystal display according to the first aspect, including:

emitting light from the backlight layer to display in the first region; and emitting light from the backlight to display in the second region.

According to a third aspect, an embodiment of the present disclosure provides a terminal, including: a lens and the liquid crystal display according to the first aspect;

wherein the lens is disposed corresponding to the first light-transmission hole in the liquid crystal display and the backlight is disposed in a neighboring region of the lens.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of various embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings may represent the same or similar elements unless otherwise represented. The implementations set forth in the following description of exemplary embodiments do not represent all implementations consistent with the invention. Instead, they are merely examples of apparatuses and methods consistent with aspects related to the disclosure as recited in the appended claims.

The inventors of the present disclosure have recognized that one of the difficulties in technologies for achieving full screen in a true sense is that a camera function and a full screen display function can not be realized at the same time. For a mobile phone using a Liquid Crystal Display (LCD) as a screen, a camera may be configured beneath the liquid crystal display in order to realize full screen. In order to dispose the camera beneath the liquid crystal display, a hole may need to be opened in the LCD and then the camera is placed in the hole. Although the camera can capture an image in front of the mobile phone through the hole, no display function can be realized at the hole. Therefore, no image can be displayed at a position corresponding to the hole when an image is displayed on the liquid crystal display, so the overall full-screen display cannot be achieved. On the other hand, in order to achieve the full-screen display, some solutions are provided to change a front photographing portion into a pop-up structure by a hardware structure or to adopt some other methods, but sacrifices will have to be made no matter in costs or production processes and user experience.

Various embodiments of the present disclosure provide a liquid crystal display, a display method and a terminal.

Figure 1:
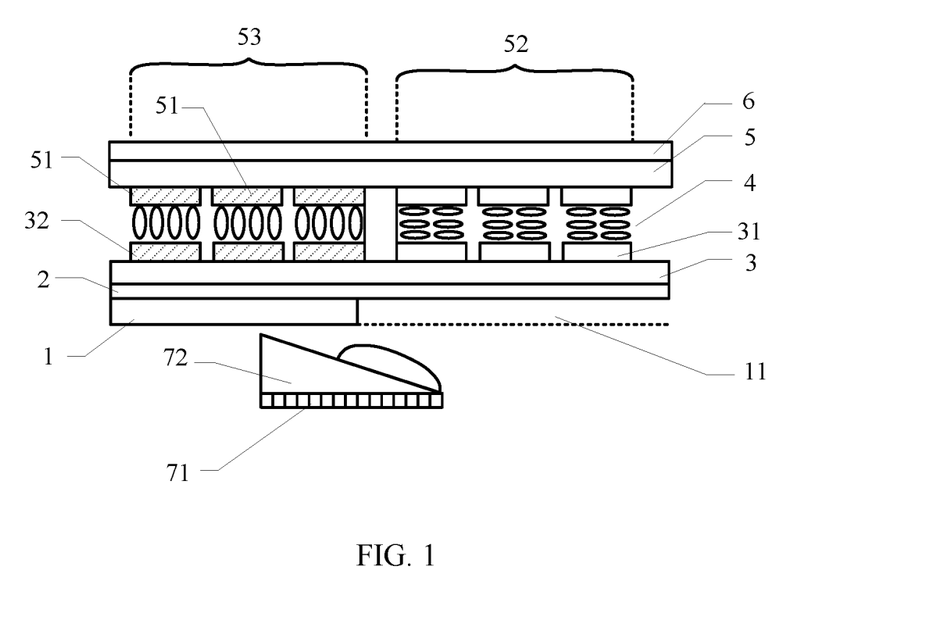
FIG. 1 is a structural schematic diagram illustrating a liquid crystal display according to some embodiments.

According to a first aspect, an embodiment of the present disclosure provides a liquid crystal display. As shown in FIG. 1, the liquid crystal display includes a backlight layer 1, an inner polarizing layer 2, an array substrate 3, a liquid crystal layer 4, a filter layer 5, an outer polarizing layer 6 and a protective layer which are sequentially disposed.

When the liquid crystal display is in operation, the backlight layer 1 emits light to provide a light source to the liquid crystal display, and the backlight layer 1 usually emits white light.

The inner polarizing layer 2 allows light having a polarization angle emitted from the backlight layer 1 to pass therethrough.

The array substrate 3 includes a driving element for driving the rotation of a liquid crystal in the liquid crystal layer 4 to further change the polarization angle of the light passing through. In some embodiments of the present disclosure, the array substrate 3 is a transparent component.

The filter layer 5 includes a color filter 51. The filter layer 5 generally includes red, green and blue filters, which help to realize the color display of the liquid crystal display.

A polarization direction of the outer polarizing layer 6 is different from that of the inner polarizing layer 2, and they are generally perpendicular to each other. According to this, light the polarization angle of which is the same as the polarization direction of the outer polarizing layer 6 after it passes through the liquid crystal layer 4 can be emitted from the liquid crystal display.

In addition, the protective layer can be a glass cover plate or a resin cover plate, and it is a transparent member for protecting other structures of the liquid crystal display.

It can be understood that an intensity of light emitted from the liquid crystal display can be changed by the liquid crystal layer 4, so that the liquid crystal display has a grayscale display effect, and an image display function is realized by the color filtering of the filter layer 5.

In some embodiments of the present disclosure, a first light-transmission hole 11 is formed on the backlight layer 1. The first light-transmission hole 11 is a region that does not emit light and allows light to pass therethrough.

For example, the first light-transmission hole 11 is a through hole on the backlight layer 1. Alternatively, the first light-transmission hole 11 is formed of a nonluminous transparent material in a preset region of the backlight layer 1. Alternatively, the first light-transmission hole 11 is a blind hole and a portion of the backlight layer 1 corresponding to the first light-transmission hole 11 is made of a transparent material.

For example, the backlight layer 1 includes one or more first light-transmission holes 11. Moreover, a size and a shape of the first light-transmission hole 11 are not limited. In use, optionally, one of the first light-transmission holes 11 corresponds to a plurality of external elements such as lenses.

Further, a colorless region corresponding to the first light-transmission hole 11 is formed between the liquid crystal layer 4 and the outer polarizing layer 6. Obviously, the colorless region is light-transmissible.

As for the implementation of the colorless region, optionally, the colorless region 52 is formed by removing a portion of the filter layer 5 corresponding to the first light-transmission hole 11. In some embodiments, the filter layer 5 includes a colorless region 52 formed of a colorless transparent material. Accordingly, the liquid crystal layer may have a first region 53 corresponding to the region on which the color filter 51 is formed, and a second region (also referred to as colorless region 52) corresponding to the region on which the colorless region 52 of the filter layer 5.

Further, the liquid crystal display further includes a backlight 7 disposed at the first light-transmission hole 11. Light of the backlight 7 is incident on the colorless region 52 of the liquid crystal display. It can be understood that the backlight 7 provides a backlight to the first light-transmission hole 11 disposed under the colorless region 52 and the image display of the colorless region 52 of the liquid crystal display can be realized by the inner polarizing layer 2, the array substrate 3, the liquid crystal layer 4 and the outer polarizing layer 5.

It should be noted that when the backlight 7 emits light, the liquid crystal in the liquid crystal layer 4 is in a light-transmitting state to allow light emitted from the backlight 7 to pass therethrough. Further, since the colorless region 52 in the first light-transmission hole 11 and the filter layer 5 is in a colorless transparent state, light emitted from the backlight 7 has no significant change in luminous flux before and after it passes through the colorless region 52. Further, the display effect of the colorless region 52 of the liquid crystal display corresponding to the backlight 7 is guaranteed.

Moreover, when the liquid crystal display and a lens are assembled, the lens is disposed corresponding to the first light-transmission hole 11. At this time, passing through the colorless region 52, light is transmitted to the lens and is received by the lens to realize an image acquisition function. It should be noted that since the colorless region 52 is in a transparent state, it does not interfere with the pass-through of light and a relatively high light-transmittance can be achieved. Therefore, the lens can acquire a complete and clear image and the effect of image acquisition will be optimized.

In addition, in some embodiments of the present disclosure, as a preferred solution, the colorless region 52 and the first light-transmission hole 11 have the same interface size and they are disposed coaxially so that a display image at the colorless region 52 and a display image other than the colorless region 52 in the liquid crystal display are formed as a whole and there is no obvious boundary therebetween, which improves the overall screen display.

Above all, an image is normally displayed in an area 53 other than the colorless region 52 of the liquid crystal display provided by the embodiment of the present disclosure; and an image is displayed in the colorless region 52 of the liquid crystal display by the backlight 7; so the full-screen display of the liquid crystal display is realized.

Moreover, since both the colorless region 52 and the first light-transmission hole 11 have light-transmittance, when the liquid crystal display and a component such as a lens are assembled, the lens can be placed under the first light-transmission hole 11. In this case, the lens can receive light that passes through the liquid crystal display from the colorless region 52 and the first light-transmission hole 11 to realize an image acquisition function.

In one embodiment, the liquid crystal display further includes a display member driving element configured to control the backlight 7 to be turned off or on. The display member driving element can be a driving circuit or a driving chip.

In one embodiment, the array substrate 3 of the liquid crystal display includes a liquid crystal driving element. Alternatively, the liquid crystal driving element includes a first liquid crystal driving element 31 and a second liquid crystal driving element 32. The first liquid crystal driving element 31 is configured to drive a liquid crystal inside the colorless region 52 to rotate while the second liquid crystal driving element 32 is configured to drive a liquid crystal other than the colorless region 52 to rotate. Alternatively, the liquid crystal driving element includes a thin film transistor in the array substrate 3.

Driven by the liquid crystal driving element, liquid crystal rotation in the liquid crystal layer 4 includes a light-transmitting state and a light-shielding state. In the light-transmitting state, the liquid crystal is rotated to change a polarization angle of an incident light, so that all or part of light is emitted out of the liquid crystal display, at this time, the liquid crystal layer 4 is in a high light-transmittance state. In the light-shielding state, the liquid crystal is rotated to change a polarization angle of an incident light to reduce light emitted out of the liquid crystal display, at this time, the liquid crystal layer 4 is in a low light-transmittance state. Moreover, the preset definition of high light-transmittance and low light-transmittance is not limited, and may be set according to the actual use.

When the liquid crystal display cooperates with the lens, the backlight 7 is turned off and the liquid crystal driving element drives the liquid crystal to be rotated to the light-transmitting state, so that light passes through the liquid crystal display and is received by the lens to realize the image acquisition function.

When the liquid crystal display is turned off, namely, the screen goes black, the backlight layer 1 and the backlight 7 do not emit light, at this time, the liquid crystal driving element drives the liquid crystal to be rotated to the light-shielding state, so that the entire liquid crystal display is in a dark state, so components under the liquid crystal display are shielded. In particular, components under the colorless region 52 are shielded, so that the liquid crystal display presents an integrated full-screen effect in a black screen state.

When the liquid crystal display performs the full-screen display, both the backlight layer 1 and the backlight 7 emit light. The liquid crystal driving element drives the liquid crystal to rotate according to a preset display effect and different display effects are realized by changing luminous flux of light that passes through. In this case, with regard to a display manner of the liquid crystal display provided by an embodiment of the present disclosure, it should be noted that the liquid crystal display includes a plurality of pixels, and the image display of the liquid crystal display is realized by the fact that each of the pixels renders a preset color.

In a portion 53 of the liquid crystal display other than the colorless region 52, each pixel includes three sub-pixels, i.e., a red sub-pixel, a green sub-pixel and a blue sub-pixel. In the filter layer 5, it is a red filter that corresponds to the red sub-pixel, a green filter that corresponds to the green sub-pixel, and a blue filter that corresponds to the blue sub-pixel. A liquid crystal driving element corresponding to each sub-pixel is included in the array substrate 3.

For one pixel, it follows the principle of superposition of three primary colors of light and different sub-pixels emit light so that the pixel exhibits a preset color. For example, the pixel presents a yellow color when the red sub-pixel and the green sub-pixel emit light at the same time. When a sub-pixel emits light, the liquid crystal driving element drives the liquid crystal corresponding to the sub-pixel to be rotated to a light-transmitting state, and then light passes through the liquid crystal layer and the filter layer.

In a portion corresponding to the colorless region 52 of the liquid crystal display, each pixel also includes three sub-pixels and the array substrate 3 includes a liquid crystal driving element corresponding to each of the sub-pixels. However, no color filter is provided in the filter layer 5. In this case, the backlight 7 is optionally a color backlight that emits colored light. Also, the backlight 7 preferably can only emit light of one color such as red, green and blue at a time.

It can be understood that the backlight 7 directly forms a colored light source at this time. Therefore, the pixel no longer needs the sub-pixels to emit light at the same time to present different luminance colors. In other words, at one point, for one pixel, only size and brightness differences instead of a luminous color difference of a light-emitting area of the pixel can be realized by driving liquid crystals corresponding to different sub-pixels to be rotated to a light-transmitting state by the liquid crystal driving element.

Further, In some embodiments of the present disclosure, the liquid crystals are selectively driven to be rotated to a light-transmitting state, so that the pixels at the colorless region 52 of the liquid crystal display are in a red color, a green color or a blue color. Moreover, by increasing a light-emitting frequency of the backlight 7 and utilizing persistence of vision of human eyes, the pixels at the colorless region 52 of the liquid crystal display rapidly switch their luminous colors to present a superimposed color such as yellow, magenta and cyan.

Figure 2:
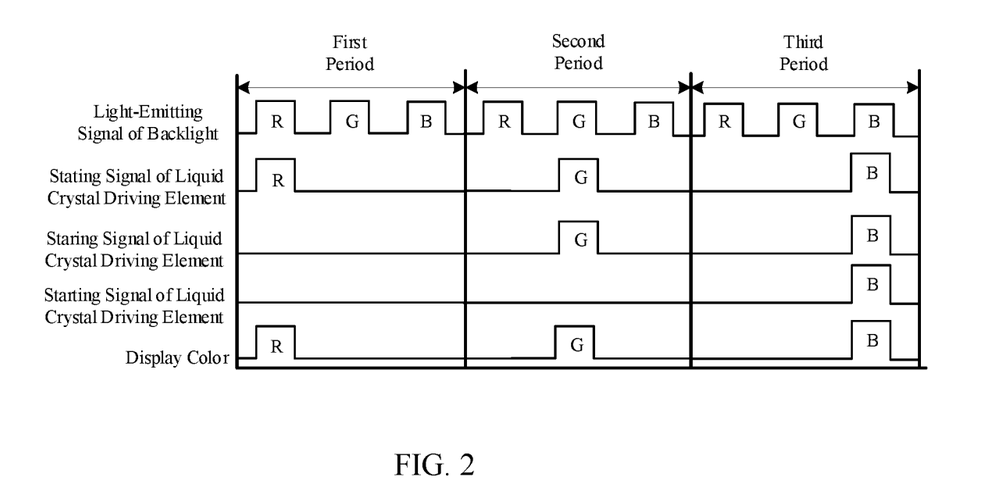
FIG. 2 illustrates operations of a liquid crystal display according to some embodiments.

In a first example, as shown in FIG. 2, in one period, the backlight 7 receives a luminescence signal for three times to emit red light, green light and blue light in a preset order. In one period, a liquid crystal driving element corresponding to a preset sub-pixel in one pixel receives a driving signal for one time, which is synchronized with at most one of the luminescence signals received by the backlight 7 for three times so that the pixel emits red light, green light or blue light.

Moreover, a liquid crystal driving element corresponding to a preset sub-pixel in one pixel receives a driving signal to drive a liquid crystal corresponding to the preset sub-pixel to be rotated to a light-transmitting state, so that the preset sub-pixel emits light.

In some embodiments, as shown in the first period in FIG. 2, a liquid crystal driving element corresponding to only one sub-pixel receives a driving signal, so that the one sub-pixel emits light. Alternatively, as shown in the second period in FIG. 2, liquid crystal driving elements corresponding to two sub-pixels receive a driving signal, so that the two sub-pixels emit light. Alternatively, as shown in the third period in FIG. 2, liquid crystal driving elements corresponding to three sub-pixels receive a driving signal, so that the three sub-pixels emit light.

Figure 3:
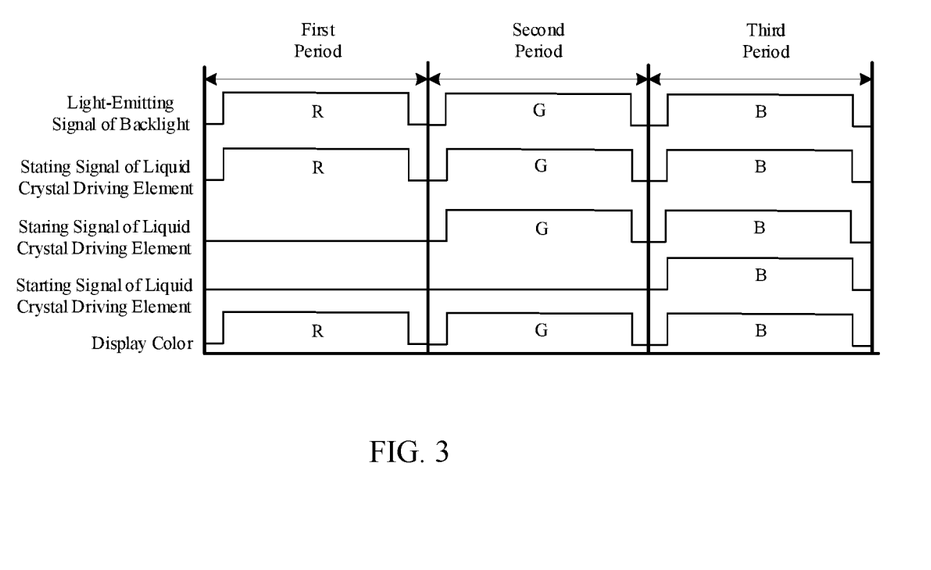
FIG. 3 illustrates another example operation of a liquid crystal display according to some embodiments.

In a second example, as shown in FIG. 3, in one period, the backlight 7 receives a luminescence signal for one time, which can be a red luminescence signal, a green luminescence signal or a blue luminescence signal. In one period, a liquid crystal driving element corresponding to a preset sub-pixel in one pixel receives a driving signal for one time, which is synchronized with the luminescence signal received by the backlight 7, so that the pixel emits red light, green light or blue light.

Moreover, a liquid crystal driving element corresponding to a preset sub-pixel in one pixel receives a driving signal, to drive a liquid crystal corresponding to the preset sub-pixel to be rotated to a light-transmitting state, so that the preset sub-pixel emits light.

In some embodiments, as shown in the first period in FIG. 3, a liquid crystal driving element corresponding to only one sub-pixel receives a driving signal, so that the one sub-pixel emits light. Alternatively, as shown in the second period in FIG. 3, liquid crystal driving elements corresponding to two sub-pixels receive a driving signal, so that the two sub-pixels emit light. Alternatively, as shown in the third period in FIG.

3, liquid crystal driving elements corresponding to three sub-pixels receive a driving signal, so that the three sub-pixels emit light.

In the above two examples, given the same period length, the backlight 7 in the first example has a higher luminescence frequency, at this time, a display image at the colorless region of the liquid crystal display is better in coherence and richer in color. In the second example, the backlight 7 emits light of the same color for a longer time, at this time, a display image at the colorless region of the liquid crystal display has higher brightness.

Further, the liquid crystal driving element adjusts and controls a rotation angle of the liquid crystal in the liquid crystal layer 4, so that a display effect of grayscale of the pixels is realized and color image display at the colorless region of the liquid crystal display.

In addition, with regard to the period, it should be noted that a luminescence period of the backlight 7 is smaller than the shortest period that human eyes can recognize, for example 42 milliseconds. In this case, the smooth display of the pixels observed by a user is guaranteed and user experience is improved. As a preferred mode, the period is less than or equal to 4.16 milliseconds.

As such, the liquid crystal display can realize a full-screen display in a true sense and have a good display effect.

Further, the backlight 7 has the following optional display modes.

The first mode: the backlight 7 is controlled to emit light to display a preset image at the colorless region 52 of the liquid crystal display. The preset image can be an image that is set in advance, for example, a pattern of a single color, or a preset pattern such as a terminal brand icon, a power icon, a Bluetooth icon, an icon of an application, or a pattern that is directly defined by the user.

The second mode: a display image at the colorless region 52 is determined according to a display image of a portion around the colorless region 52 of the liquid crystal display.

For example, display parameters of an image around the colorless region 52 are obtained. The display parameters include, but are not limited to, at least one of a brightness parameter or a color parameter. The backlight 7 is controlled to emit light according to the obtained display parameters so that the image displayed at the colorless region 52 and the image displayed around the colorless region 52 are formed as a whole.

For example, if there is an app interface in a current screen display interface, the colorless region 52 is surrounded by a pink background interface, and in the second mode, pink and a brightness parameter value of the background interface can be obtained and a light-emitting element is controlled according to the pink and the brightness parameter value to realize screen display at the colorless region 52, therefore a more consistent display effect is achieved.

The third mode: the backlight 7 is controlled to emit light according to a display content at the colorless region 52 of the liquid crystal display.

For example, if the colorless region 52 is located in a region in which time is displayed of the liquid crystal display, a content to be displayed at the colorless region 52 such as "17:15" can be obtained and the backlight 7 is controlled to emit light according to the content to be displayed, i.e., display image "17:15". Of course, the content displayed at the colorless region 52 can also be part of a complete image, for example, the complete image is "17:15" and the content to be displayed is ":15".

In one embodiment, a liquid crystal driving element of the liquid crystal display 1 is connected to a display member driving element of the backlight to transmit a display signal. In other words, the liquid crystal driving element can be in communication with the display member driving element. Further, the liquid crystal driving element and the display member driving element can synchronize a region 53 other than the colorless region 52 of the liquid crystal display with the display content of the backlight 7, therefore the full-screen display is optimized.

In some embodiments, as shown in FIG. 1, the backlight 7 optionally includes a light-emitting element 71 and a light-gathering element 72. The light-gathering element 72 is disposed on a light-emitting surface of the light-emitting element 71 to allow light emitted from the light-emitting element 71 to be uniformly incident on the colorless region 52 of the liquid crystal display.

For example, the backlight 7 is selected from at least one of a mini Light-Emitting Diode (LED), a mini LED array, a Micro Light-Emitting Diode (Micro LED), a Micro LED array, a liquid crystal display and an Organic Light-Emitting Diode (OLED) array. Also, the backlight 7 optionally has a flat light-emitting surface or a curved light-emitting surface.

For example, the light-gathering element 72 can optionally be a prism, a microlens array, a lens array or a combination thereof. Of course, the light-gathering element 72 can be modifications on a prism, a microlens, a microlens array, a lens array, which is not limited herein, so that light is uniformly displayed on a display screen corresponding to the first light-transmission hole. A shape of the light-gathering element 72 is not limited, for example, the light-gathering element 72 has curved or inclined light incident surface and/or light-exiting surface. Therefore, light emitted from light-emitting elements at different positions of the backlight 7 is uniformly distributed in the colorless regions 52 of the liquid crystal display, so the display effect of the colorless region 52 is optimized.

In some embodiments, a second light-transmission hole 21 is formed in the inner polarizing layer 2 of the liquid crystal display. Alternatively, the second light-transmission hole 21 is formed by opening a through hole; or it is formed by providing a transparent region which does not polarize light on the inner polarizing layer 2.

In this case, when the liquid crystal display and a lens are assembled, the lens is disposed corresponding to the second light-transmission hole 21. Thus, a light-transmittance of the liquid crystal display is improved by the second light-transmission hole 21 and an image acquisition effect of the lens is optimized.

Further, the backlight 7 further includes an auxiliary polarizing layer 73 on the light-emitting side of the light-emitting element 71. The auxiliary polarizing layer 73 replaces the inner polarizing layer 2 at the second light-transmission hole 21 and works to polarize light, to ensure the normal display of the colorless region 52 of the liquid crystal display when the second light-transmission hole 21 is provided.

Figure 4:
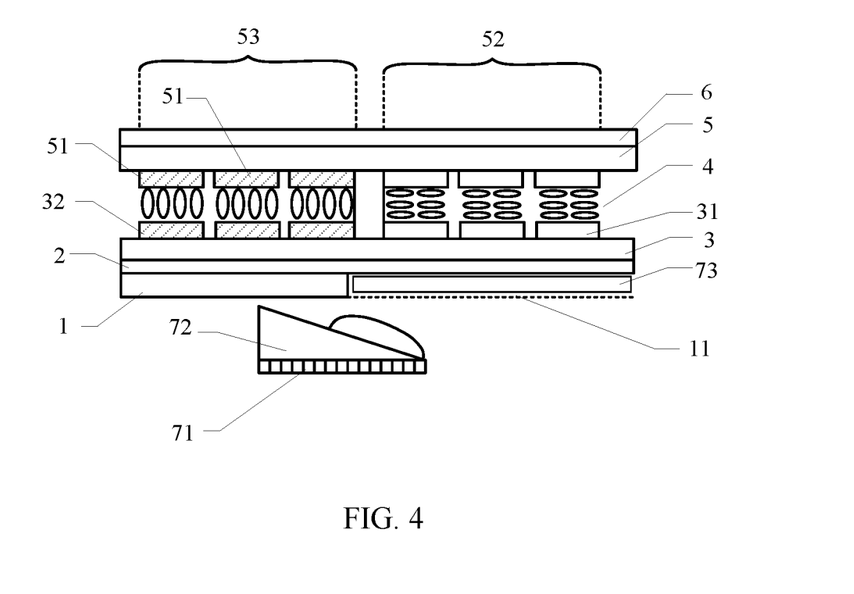
FIG. 4 is a first structural schematic diagram illustrating a liquid crystal display according to some embodiments.
Figure 5:
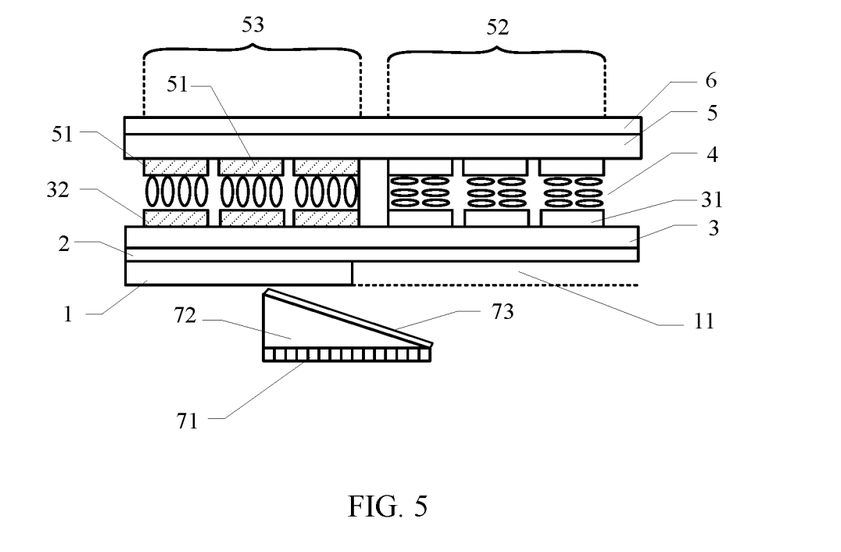
FIG. 5 is a second structural schematic diagram illustrating a liquid crystal display according to some embodiments.
Figure 6:
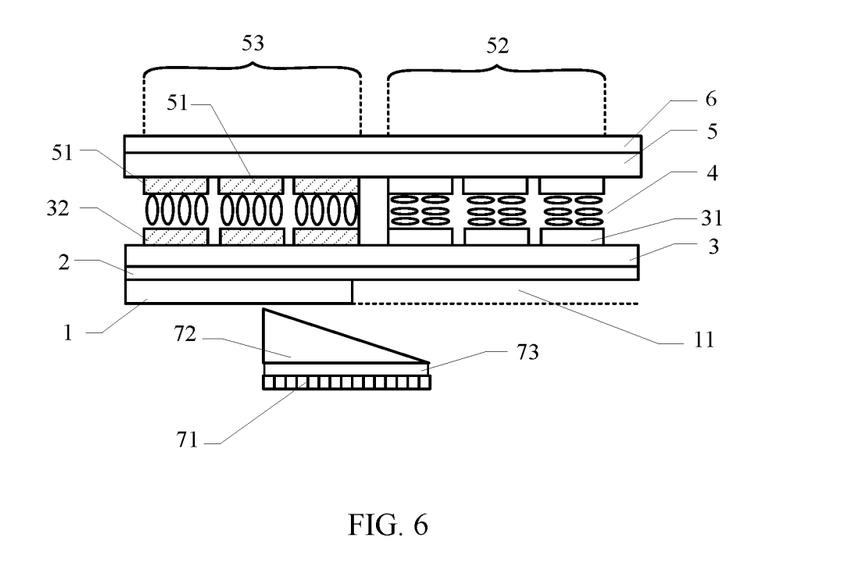
FIG. 6 is a third structural schematic diagram illustrating a liquid crystal display according to some embodiments.

Alternatively, as shown in FIG. 4, the auxiliary polarizing layer 73 is disposed in the second light-transmission hole 21. Alternatively, as shown in FIG. 5, the auxiliary polarizing layer 73 is disposed on the side of the light-gathering element 72 away from the light-emitting element 71. Alternatively, as shown in FIG. 6, the auxiliary polarizing layer 73 is disposed on the side of the light-gathering element 72 facing the light-emitting element 71.

Accordingly, given the improved light-transmittance and optimized image acquisition effect of the lens to which the liquid crystal display is fitted, the liquid crystal display provided in the embodiment ensures its normal display at the colorless region 52.

In addition, in some embodiments, the backlight layer 1 includes a light guide plate for uniformizing luminescence of a light source, so that when the first light-transmission hole 11 is formed, the first light-transmission hole 11 passes through the light guide plate. Therefore, light in the light guide plate might enter the first light-transmission hole 11, which may affect the display effect of the backlight 7.

Therefore, the liquid crystal display optionally further includes a light-shielding member disposed on a side wall of the first light-transmission hole 11 (when the first light-transmission hole 11 is formed by opening a hole, the light-shielding member is disposed on the side wall of the first light-transmission hole 11). The light-shielding member blocks light emitted from the backlight layer 1 so that the first light-transmission hole 11 only allows light emitted from the backlight 7 to pass through to ensure the display effect of the first light-transmission hole 11.

There are many choices of configuring positions and structures of the light-emitting element 71 and the light-gathering element 72 in the backlight 7 which are described as follows.

Figure 7:
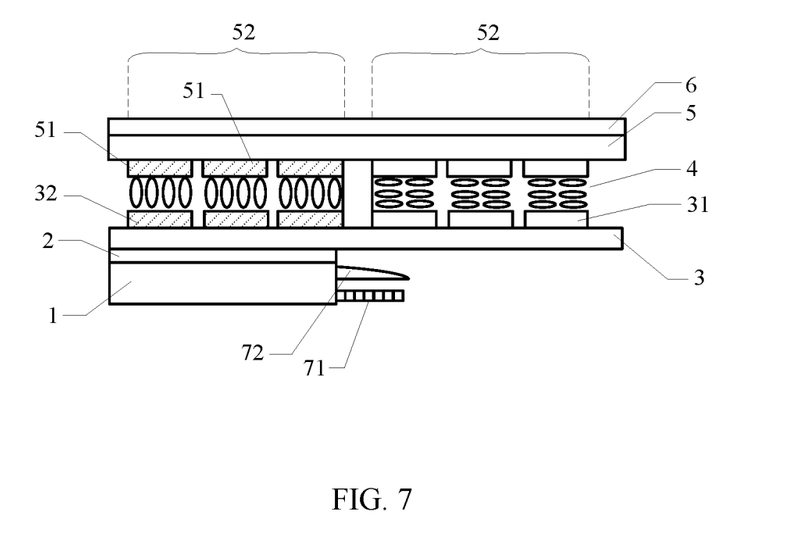
FIG. 7 is a fourth structural schematic diagram illustrating a liquid crystal display according to some embodiments.
Figure 8:
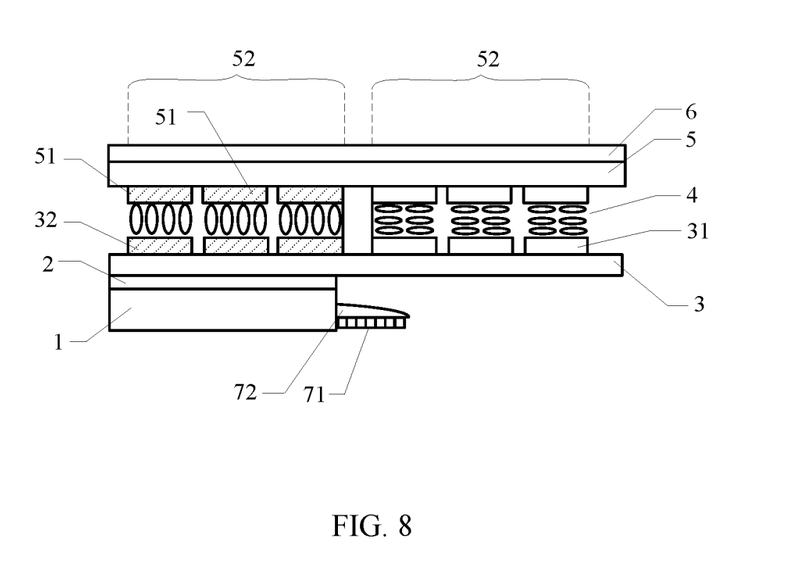
FIG. 8 is a fifth structural schematic diagram illustrating a liquid crystal display according to some embodiments.

As an example, as shown in FIG. 7 and FIG. 8, the first light-transmission hole 11 is formed by opening a hole and the light-emitting element 71 and/or the light-gathering element 72 are disposed in the first light-transmission hole 11 but their positions in the first light-transmission hole 11 are not particularly limited. For example, the light-emitting element 71 and the light-gathering element 72 are disposed at the edge of the first light-transmission hole 11. Alternatively, the light-emitting element 71 and the light-gathering element 72 are disposed in the central part of the first light-transmission hole 11.

In the embodiment, the light-emitting element 71 and/or the light-gathering element 72 are optionally connected to the side wall of the first light-transmission hole 11 for ease of mounting and fixation. For example, they are connected to the first light-transmission hole 11 through interference fit or by an adhesive. The connection way makes it easy to install the light-gathering element 72.

Further, optionally, as shown in FIG. 3, a gap is provided between the light-emitting element 71 and the light-gathering element 72; or as shown in FIG. 4, the light-emitting surface of the light-emitting element 71 is covered with the light-gathering element 72.

As an example, the light-emitting element 71 and the light-gathering element 72 are disposed under the liquid crystal display in a region surrounding the first light-transmission hole 11.

Figure 9:
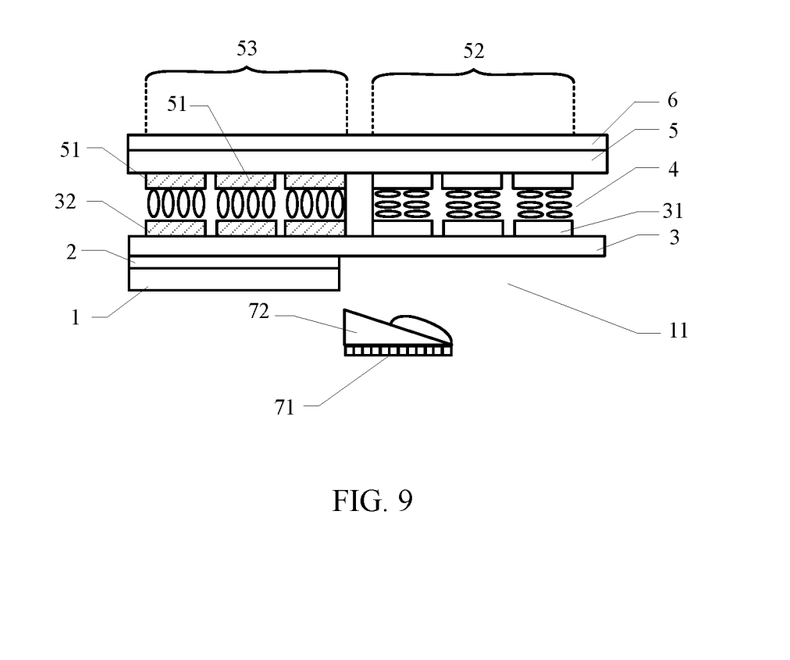
FIG. 9 is a sixth structural schematic diagram illustrating a liquid crystal display according to some embodiments.

For example, as shown in FIG. 9, the backlight 7 is located below the liquid crystal display and is disposed corresponding to the colorless region 52. In some embodiments, the backlight 7 and/or the light-gathering element 72 are connected to a bottom surface of the backlight layer 3 of the display panel.

In the embodiment, the light-gathering element 72 is optionally disposed on the light-emitting element 71. In this manner, light emitted from the light-emitting element 71 is exiting outside after passing through the light-gathering element 72 and a concentrating effect of the light-gathering element 72 is achieved. For example, the light-gathering element 72 is attached to the light-emitting element 71 by an adhesive, which can be a transparent material to ensure the light-transmitting property of the light-gathering element 72.

Of course, the light-gathering element 72 is optionally connected to the side wall of the first light-transmission hole 11, and is located in the first light-transmission hole 11 and the light-emitting element 71 is disposed under the liquid crystal display. The installation positions and manners of the light-emitting element 71 and the light-gathering element 72 relative to the first light-transmission hole 11 can be selected according to actual needs.

Alternatively, for example, as shown in FIG. 1, the backlight 7 is disposed in a region surrounding the first light-transmission hole 11 below the liquid crystal display. Alternatively, the light-emitting element 71 and the light-gathering element 72 include a portion corresponding to the colorless region 52 and a portion laterally beyond the colorless region 52. Moreover, the light-emitting element 71 and the light-gathering element 72 are optionally disposed around a preset region which is used to provide a lens.

What needs to be emphasized is that in the embodiment of the present disclosure, in addition to a lens and an image acquisition module, the liquid crystal display and other optical function modules can be assembled. By the liquid crystal display provided by the embodiment of the present disclosure, both the light-transmittance and the full-screen display effect are realized and user experience is improved.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

Figure 10:
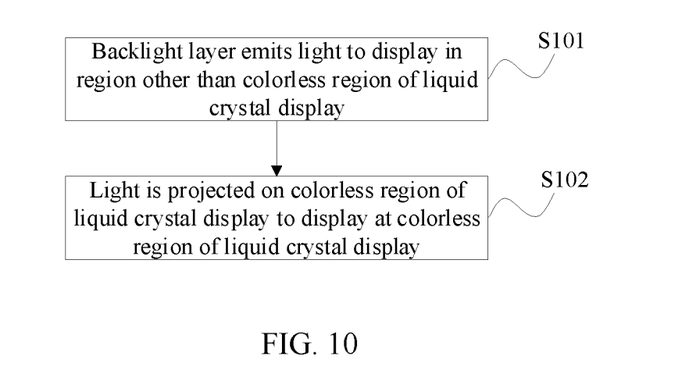
FIG. 10 is a first flowchart illustrating a display method according to some embodiments.

According to a second aspect, an embodiment of the present disclosure provides a display method, which is applied to the liquid crystal display according to the first aspect above-described. As shown in FIG. 10, the method includes:

In step S101, the backlight layer emits light to display in a region other than the colorless region of the liquid crystal display.

Specifically, the backlight layer emits light and the liquid crystal driving element in the array substrate drives the liquid crystal to be rotated to adjust and control luminous flux of light exited out of the outer polarizing layer, to display the image in the region of the liquid crystal display other than the colorless region with the filter layer.

In step S102, the backlight emits light which is projected on the colorless region of the liquid crystal display to display at the colorless region of the liquid crystal display.

Specifically, the backlight provides a backlight source. The liquid crystal of the liquid crystal layer in the liquid crystal display corresponding to the colorless region is rotated to a light-transmitting state and the polarization angle of light emitted from an image display element (i.e., the backlight) is changed, so that the light passes through the outer polarizing layer, to realize the display at the colorless region of the liquid crystal display.

Figure 11:
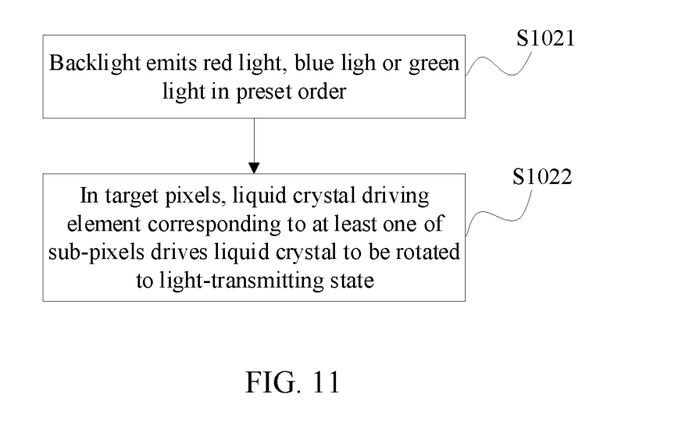
FIG. 11 is a second flowchart illustrating a display method according to some embodiments.

In some embodiments, as shown in FIG. 11, step S102 includes steps S1021 and S1022.

In step S1021, the backlight emits red light, blue light or green light in a preset order.

As an example, as shown in FIG. 2, in one period, the backlight receives a plurality of luminescence signals and emits light for multiple times, for example, three times as shown in FIG. 2. Moreover, optionally, red light, blue light and green light are emitted respectively during one period. Alternatively, as another example, as shown in FIG. 3, during one period, the backlight receives a luminescence signal and emits light for one time. Light of the same color or of different colors is optionally emitted during adjacent periods. It should be noted that in the above example, the period is smaller than the shortest period that the human eyes can recognize, preferably, the period is less than 4.16 milliseconds.

In step S1022, in target pixels, a liquid crystal driving element corresponding to at least one of sub-pixels drives the liquid crystal to be rotated to a light-transmitting state. It can be understood that the target pixels are pixels corresponding to the colorless region of the liquid crystal display.

Specifically, as shown in FIGS. 2 and 3, in one period, a liquid crystal driving element corresponding to at least one of sub-pixels receives a driving signal once, and drives a liquid crystal to be rotated to a light-transmitting state. The number of sub-pixels that emit light is not limited, for example, it is one, two or three.

A rotation degree of the liquid crystal in the light-transmitting state is not limited. For example, the rotation degree of the liquid crystal is controlled according to an expected display image to adjust and control a polarization angle of an incident light and achieve grayscale display.

In addition, the liquid crystal driving element of the liquid crystal display communicates with the display member driving element of the image display element, and a display content displayed in the region other than the colorless region of the liquid crystal display may be synchronized with the content displayed in the colorless region. Since the liquid crystal driving element and the display member driving element can communicate with each other, information can be transferred therebetween, so that a complete and consistent full-screen display effect will be achieved.

It should be noted that when the liquid crystal display screen and the image acquisition module are assembled and both the backlight and the backlight layer emit light, the image acquisition module is turned off.

Moreover, the above steps are merely for convenience of descriptions and do not limit the orders in actual operations. Therefore, steps S101 and S102 can be optionally performed at the same time, or step S102 is performed before step S101.

Figure 12:
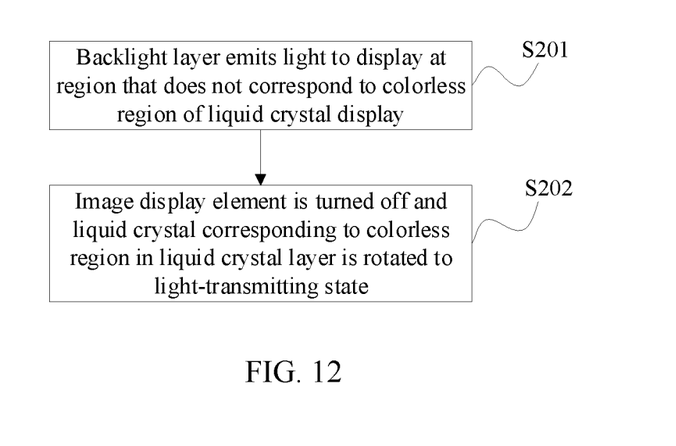
FIG. 12 is a third flowchart illustrating a display method according to some embodiments.

In some embodiments, as shown in FIG. 12, the method further includes S201 and S202.

In step S201, a backlight layer emits light to display at a region that does not correspond to a colorless region of a liquid crystal display.

At this time, a liquid crystal driving element drives a liquid crystal that does not correspond to the colorless region to be rotated, so that the image display of a portion that does not correspond to the colorless region of the liquid crystal display is realized.

In step S202, an image display element is turned off and a liquid crystal corresponding to the colorless region in a liquid crystal layer is rotated to a light-transmitting state, so that light acquisition is realized. That is, the external light is allowed to enter the inside of the display through the colorless region.

A display member driving element controls the image display element to be turned off, at this time, the image display element no longer emits light. Moreover, the liquid crystal driving element drives the liquid crystal corresponding to the colorless region in the liquid crystal layer to be rotated to the light-transmitting state, so that light can penetrate a portion corresponding to the colorless region of the liquid crystal display.

This method can be optionally applied to the assembling of the liquid crystal display and the lens. At this time, the lens is disposed below the colorless region. When in use, light other than the liquid crystal display can penetrate the colorless region and be received by the lens to realize light collection and image acquisition.

Figure 13:
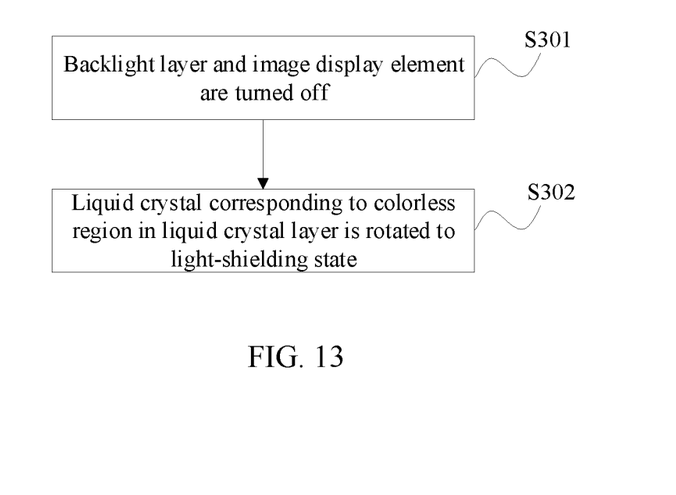
FIG. 13 is a fourth flowchart illustrating a display method according to some embodiments.

In some embodiments, as shown in FIG. 13, the method further includes S301 and S302.

In step S301, a backlight layer and an image display element are turned off.

At this time, the backlight layer no longer emits light and a display panel that does not correspond to a colorless region is in a dark state. A display member driving element controls the image display element to be turned off.

In step S302, a liquid crystal corresponding to the colorless region in a liquid crystal layer is rotated to a light-shielding state and screen-off is achieved.

A light-transmittance of the liquid crystal layer corresponding to the colorless region is lowered by rotating the liquid crystal, so that the colorless region of a liquid crystal display is also in a dark state.

This method is applied to the situation in which the liquid crystal display is in a black screen state. A component or structure under the colorless region is shielded by rotating the liquid crystal corresponding to the colorless region in the liquid crystal layer to the light-shielding state. Moreover, at this time, the colorless region of the display screen is in a dark state and the difference between display effect of the colorless region of the liquid crystal display and display effect other than the colorless region of the liquid crystal display can be mitigated, so the full-screen effect will be optimized.

Figure 14:
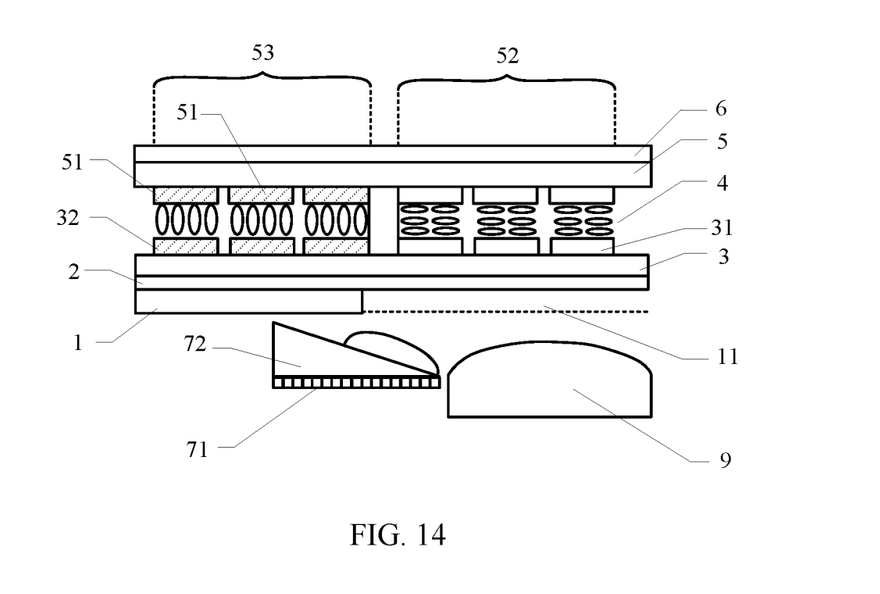
FIG. 14 is a structural diagram illustrating a terminal according to some embodiments.

According to a third aspect, an embodiment of the present disclosure provides a terminal. As shown in FIG. 14, the terminal includes a lens 9 and the above liquid crystal display according to the first aspect. The lens 9 is disposed corresponding to the first light-transmission hole 11 in the liquid crystal display and the backlight 7 is disposed in a region surrounding the lens 9.

For example, the backlight 7 is disposed on a side of the lens 9, or is disposed surrounding the lens 9. When the backlight 7 is disposed surrounding the lens 9, a plurality of backlights 7 are optionally employed, and are surrounding the lens 9. Alternatively, a separate backlight 7 can be used optionally and a through hole corresponding to the first light-transmission hole 11 is disposed on the backlight 7 and the lens 9 is inserted into the through hole.

In the example, the backlight 7 and the lens 9 do not affect each other and both the full-screen display of the liquid crystal display and the image acquisition effect of the lens 9 can be achieved.

Figure 15:
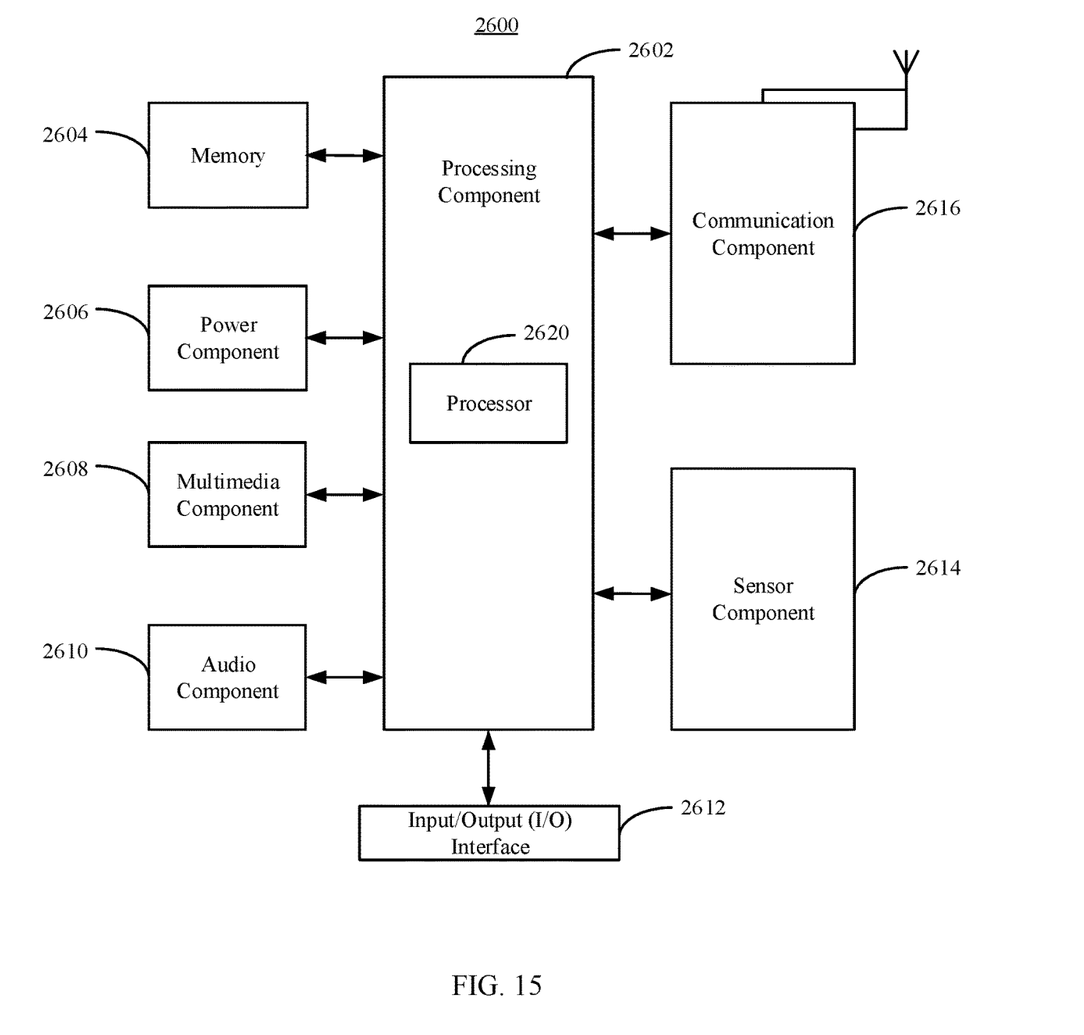
FIG. 15 is a block diagram illustrating a terminal according to some embodiments.

FIG. 15 is a diagram illustrating a terminal 2600 according to an embodiment of the present disclosure. For example, the device 2600 may be a mobile phone, a computer, a digital broadcast terminal, a messaging device, a gaming console, a tablet, a medical device, exercise equipment, a personal digital assistant, and the like.

Referring to FIG. 15, the device 2600 may include one or more of the following components: a processing component 2602, a memory 2604, a power component 2606, a multimedia component 2608, an audio component 2610, an input/output (I/O) interface 2612, a sensor component 2614, and a communication component 2616.

The processing component 2602 typically controls overall operations of the device 2600, such as the operations associated with display, telephone calls, data communications, camera operations, and recording operations. The processing component 2602 may include one or more processors 2620 to execute instructions to perform all or part of the steps in the above described methods. Moreover, the processing component 2602 may include one or more modules which facilitate the interaction between the processing component 2602 and other components. For instance, the processing component 2602 may include a multimedia module to facilitate the interaction between the multimedia component 2608 and the processing component 2602.

The memory 2604 is configured to store various types of data to support the operation of the device 2600. Examples of such data include instructions for any applications or methods operated on the device 2600, contact data, phonebook data, messages, pictures, video, etc. The memory 2604 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2606 provides power to various components of the device 2600. The power component 2606 may include a power management system, one or more power sources, and any other components associated with the generation, management, and distribution of power in the device 2600.

The multimedia component 2608 includes a screen providing an output interface between the device 2600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2608 includes a front camera and/or a rear camera. The front camera and/or the rear camera may receive an external multimedia datum while the device 2600 is in an operation mode, such as a photographing mode or a video mode. Each of the front camera and the rear camera may be a fixed optical lens system or have focus and optical zoom capability.

The audio component 2610 is configured to output and/or input audio signals. For example, the audio component 2610 includes a microphone ("MIC") configured to receive an external audio signal when the device 2600 is in an operation mode, such as a call mode, a recording mode, and a voice recognition mode. The received audio signal may be further stored in the memory 2604 or transmitted via the communication component 2616. In some embodiments, the audio component 2610 further includes a speaker to output audio signals.

The I/O interface 2612 provides an interface between the processing component 2602 and peripheral interface modules, such as a keyboard, a click wheel, buttons, and the like. The buttons may include, but are not limited to, a home button, a volume button, a starting button, and a locking button.

The sensor component 2614 includes one or more sensors to provide status assessments of various aspects of the device 2600. For instance, the sensor component 2614 may detect an open/closed status of the device 2600, relative positioning of components, e.g., the display and the keypad, of the device 2600, a change in position of the device 2600 or a component of the device 2600, a presence or absence of user contact with the device 2600, an orientation or an acceleration/deceleration of the device 2600, and a change in temperature of the device 2600. The sensor component 2614 may include a proximity sensor configured to detect the presence of nearby objects without any physical contact. The sensor component 2614 may also include a light sensor, such as a CMOS or CCD image sensor, for use in imaging applications. In some embodiments, the sensor component 2614 may also include an accelerometer sensor, a gyroscope sensor, a magnetic sensor, a pressure sensor, or a temperature sensor.

The communication component 2616 is configured to facilitate communication, wired or wirelessly, between the device 2600 and other devices. The device 2600 can access a wireless network based on a communication standard, such as WiFi, 2G, or 3G, or a combination thereof. In one exemplary embodiment, the communication component 2616 receives a broadcast signal or broadcast associated information from an external broadcast management system via a broadcast channel. In one exemplary embodiment, the communication component 2616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2604, executable by the processor 2620 in the device 2600, for performing the above-described methods. For example, the non-transitory computer-readable storage medium may be a ROM, a RAM, a CD-ROM, a magnetic tape, a floppy disc, an optical data storage device, and the like.

A structured light module provided by the embodiments of the present disclosure can have one or more of the following advantages:

An image is normally displayed in a portion other than the colorless region of the liquid crystal display provided by the embodiments of the present disclosure; and an image is displayed in a portion corresponding to the colorless region of the liquid crystal display by means of the backlight, so that the full-screen display of the liquid crystal display will be realized. Moreover, both the first light-transmission hole and the colorless region in the liquid crystal display have light-transmittance, when the liquid crystal display and the lens are assembled, the lens can be placed under the colorless region, so that the lens can receive light that passes through the colorless region to realize an image acquisition function. Namely, the liquid crystal display provided by the embodiments of the present disclosure can achieve both the full-screen display and the image display acquisition function.

Various operations described in this disclosure can be implemented as operations performed by a data processing apparatus on data stored on one or more non-transitory computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A liquid crystal display, comprising:
    a liquid crystal layer, comprising a first region and a second region;
    a backlight layer disposed under the liquid crystal layer and formed with a first light-transmission hole, wherein light of the backlight layer is emitted for display in the first region and the first light-transmission hole being disposed under the second region; and
    a backlight disposed at the first light-transmission hole, wherein light of the backlight is projected on the second region through the first light-transmission hole, wherein the backlight comprises a light-emitting element and a light-gathering element disposed on a light-emitting side of the light-emitting element, wherein the light-gathering element is configured to allow light emitted from the light-emitting element to be uniformly projected onto the second region;
    wherein the light crystal display further comprises an inner polarizing layer disposed between the backlight layer and the liquid crystal layer, wherein a second light-transmission hole corresponding to the first light-transmission hole is formed in the inner polarizing layer, and wherein the backlight further comprises an auxiliary polarizing layer disposed on a light-emitting side of the light-emitting element,
    wherein the auxiliary polarizing layer is disposed on a side of the light-gathering element away from the light-emitting element; or
    the auxiliary polarizing layer is disposed on a side of the light-gathering element facing the light-emitting element.

2. The liquid crystal display according to claim 1, further comprising:
    a filter layer disposed on the liquid crystal layer,
    wherein the filter layer comprises a colorless region corresponding to the first light-transmission hole.

3. The liquid crystal display according to claim 1, wherein the light-emitting element is a color light-emitting member.

4. The liquid crystal display according to claim 1, further comprising a liquid crystal driving element,
    wherein a liquid crystal in the second region has a light-transmitting state driven by the liquid crystal driving element.

5. The liquid crystal display according to claim 4, wherein the liquid crystal in the second region further has a light-shielding state driven by the liquid crystal driving element, wherein a light-transmittance of the liquid crystal in the light-shielding state is smaller than that of the liquid crystal in the light-transmitting state.

6. The liquid crystal display according to claim 1, further comprising:
    a backlight driving element configured to drive the backlight to be turned on or off.

7. The liquid crystal display according to claim 1, wherein a liquid crystal driving element of the liquid crystal display is connected to and in communication with a backlight driving element of the backlight; and
    the liquid crystal driving element and the backlight driving element are configured such that a content displayed in the first region is synchronized with a content displayed in the second region.

8. The liquid crystal display according to claim 1, wherein the backlight is selected from at least one of a mini light-emitting diode element or element array, a micro light-emitting diode, a micro light-emitting diode element or element array, a liquid crystal display member and an organic light-emitting diode element or element array.

9. The liquid crystal display according to claim 1, wherein the light-gathering element is selected from at least one of a prism, a microlens array, or a lens array.

10. The liquid crystal display according to claim 1, wherein the backlight is located in a neighboring region of the first light-transmission hole below the backlight layer; or
    the backlight is located in the first light-transmission hole.

11. A display method applied to the liquid crystal display according to claim 1, the method comprising:
    emitting light from the backlight layer to display in the first region; and
    emitting light from the backlight to display in the second region.

12. The method according to claim 11, wherein emitting light from the backlight to display in the second region comprises:
    driving liquid crystal in the second region to be rotated to a light-transmitting state and changing a polarization angle of the light emitted from the backlight, to display in the second region.

13. The method according to claim 11, further comprising:
    communicating between a liquid crystal driving element of the liquid crystal display and a backlight driving element of the backlight, such that images displayed in the first region and the second region are synchronized.

14. The method according to claim 11, further comprising:
    emitting light from the backlight layer to display in the first region; and
    turning off the backlight, and driving liquid crystal in the second region to be rotated to a light-transmitting state, to allow external light to enter the liquid crystal display through the first light-transmission hole.

15. The method according to claim 11, further comprising:
    turning off the backlight layer and the backlight, and driving liquid crystal in the second region to be rotated to a light-shielding state to realize screen-off.

16. The method according to claim 11, wherein the emitting light from the backlight to display in the second region comprises:
    emitting red, blue or green light from the backlight in a preset order; and in target pixels in the second region, driving liquid crystal corresponding to at least one of sub-pixels to be rotated to a light-transmitting state;

wherein the emitting red, blue or green light from the backlight in the preset order comprises:

in one period, the backlight receiving a luminescence signal and emitting light for one time; or in the one period, the backlight receiving a plurality of luminescence signals and emitting light for multiple times;

wherein the period is less than a shortest period that human eyes can recognize; and wherein the driving the liquid crystal corresponding to at least one of sub-pixels to be rotated to the light-transmitting state comprises:

in the one period, receiving a driving signal by the liquid crystal driving element corresponding to at least one of sub-pixels for one time to drive the liquid crystal to be rotated to the light-transmitting state.

17. A terminal, comprising: a lens and the liquid crystal display according to claim 1;

wherein the lens is disposed corresponding to the first light-transmission hole in the liquid crystal display and the backlight is disposed in a neighboring region of the lens; and wherein the backlight is disposed surrounding the lens; or the backlight is disposed on a side of the lens; or the backlight comprises a hollow region corresponding to the first light-transmission hole, and the lens is inserted into the hollow region.

* * * * *